(12) United States Patent
Huang et al.

(10) Patent No.: US 12,101,026 B2
(45) Date of Patent: Sep. 24, 2024

(54) METAL-OXIDE SEMICONDUCTOR FIELD-EFFECT TRANSISTOR WITH ASYMMETRIC PARALLEL DIES AND METHOD OF USING THE SAME

(71) Applicant: Potens Semiconductor Corp., Hsinchu County (TW)

(72) Inventors: Wen Nan Huang, Hsinchu County (TW); Ching Kuo Chen, Hsinchu County (TW); Chih Ming Yu, Hsinchu County (TW); Hsiang Chi Meng, Hsinchu County (TW); Tung Ming Lai, Hsinchu County (TW)

(73) Assignee: POTENS SEMICONDUCTOR CORP., Zhubei (TW)

( * ) Notice: Subject to any disclaimer, the term of this patent is extended or adjusted under 35 U.S.C. 154(b) by 388 days.

(21) Appl. No.: 17/533,965

(22) Filed: Nov. 23, 2021

(65) Prior Publication Data

US 2023/0037951 A1 Feb. 9, 2023

(30) Foreign Application Priority Data

Aug. 3, 2021 (TW) .................................. 110128603

(51) Int. Cl.
*H02M 3/156* (2006.01)
*H02M 3/158* (2006.01)

(52) U.S. Cl.
CPC ....... *H02M 3/1566* (2021.05); *H02M 3/1584* (2013.01)

(58) Field of Classification Search
CPC ..... G06F 1/263; H02M 1/10; H02M 3/33561; H02M 7/003; H02M 3/088; H02M 3/1584; H02M 3/1566; H02M 1/084; H02M 3/003; H02M 3/33523; H01L 25/112; H01L 25/115; H01L 23/34; H01L 23/528; H01L 27/088; H01L 29/088; H01L 29/2003; H01L 23/49503; H01L 23/49562; H01L 23/49575; H01L 23/62; H01L 23/072; H01L 23/0248; H01L 29/1033; H01L 29/402; H01L 29/41758; H01R 13/6675;

(Continued)

(56) References Cited

U.S. PATENT DOCUMENTS 8,704,269 B2 * 4/2014 Macheiner .......... H01L 29/7835
257/107
9,129,979 B2 * 9/2015 Koike ..................... H01L 24/34
(Continued)

FOREIGN PATENT DOCUMENTS

CN 102904424 B 1/2016

*Primary Examiner* — Jeffrey A Gblende
(74) *Attorney, Agent, or Firm* — MUNCY GEISSLER OLDS & LOWE P.C.

(57) ABSTRACT

A metal-oxide semiconductor field-effect transistor with asymmetric parallel dies and a method of using the same, including an inductor, a load recognition control unit and a metal-oxide semiconductor field-effect transistor having a first die, a second die, and a switch. The first die is larger in size than the second die. The inductor produces a voltage signal when the load changes. The switch is controlled by the load recognition control unit such that different dies are switched on under different load conditions, thereby improving efficiency under light load condition in addition to reducing volume and cost.

5 Claims, 6 Drawing Sheets

(58) Field of Classification Search
CPC ........ H01R 29/00; H01R 31/065; G09G 3/20; H02K 11/046; H01F 2027/406; H01F 27/30; H01F 41/0246; H05K 7/20927; H05K 2201/10166; H05K 2201/10507; H05K 7/2089
See application file for complete search history.

(56) References Cited

U.S. PATENT DOCUMENTS

| | | | | |
|---|---|---|---|---|
| 2016/0142018 A1* | 5/2016 | Williams | ............. | H03F 1/0205 330/251 |
| 2019/0214332 A1* | 7/2019 | Chen | ................. | H01L 23/49517 |
| 2019/0214333 A1* | 7/2019 | Chen | ................... | H01L 29/7393 |

* cited by examiner

| Load | 1% | 2% | 3% | 4% | 5% |
|---|---|---|---|---|---|
| Efficiency with use of the present disclosure | 82.3% | 82.7% | 83.1% | 83.6% | 84.5% |
| Efficiency without use of the present disclosure | 84.2% | 85.1% | 85.6% | 86.5% | 87.2% |

METAL-OXIDE SEMICONDUCTOR FIELD-EFFECT TRANSISTOR WITH ASYMMETRIC PARALLEL DIES AND METHOD OF USING THE SAME

BACKGROUND OF INVENTION

(1) Field of the Present Disclosure

The present disclosure relates to a metal-oxide semiconductor field-effect transistor, and more particularly to a metal-oxide semiconductor field-effect transistor which is applied to power conversion, has asymmetric parallel dies and can be modulated based on the load.

(2) Brief Description of Related Art

With the development of science and technology, people's requirements for transistor switches getting higher and higher. In addition to the requirement to reduce the size of the switch and reduce the switching loss, the improvement of efficiency has also become an important issue. Notebook computers that use batteries to supply power have a variety of different circuits and loads, such as: CPU, GPU, and memory, etc., which are powered by different voltage lines. The circuit load will change with different operating conditions. For example, when a heavy load is switched to a light load. Sometimes only about 10-20% conversion efficiency can be reached, or the efficiency is not good when carrying out light load, thereby causing unnecessary energy consumption.

As for how to effectively improve the light load efficiency, there has been a switching regulator with improved light load efficiency disclosed in China Patent No. CN102904424B, which includes a controller, a multi-phase buck converter, and an auxiliary low-power phase. The operation of the multi-phase buck converter and the auxiliary low-power phase can be controlled by the controller. The multi-phase buck converter includes a plurality of main phases and is configured to convert the input voltage $V_{dd2}$ into a lower voltage to be applied to electronic devices under different load conditions. In this way, a small amount of output current is delivered to the electronic device under light load conditions. Meanwhile, the efficiency of the switching regulator under light load conditions is increased. However, the technical means disclosed in the CN102904424B need to have multiple main phases. As a result, this will make the control switch have a larger volume and cost. Meanwhile, it will face the problem of being unable to achieve light weight, simplicity, and low cost. Accordingly, how to take into account the size and cost, and effectively improve the efficiency under the light load, is a problem to be resolved.

SUMMARY OF INVENTION

It is a primary object of the present disclosure to provide a metal-oxide semiconductor field-effect transistor with asymmetric parallel dies through which the dies for conduction can be changed according to the magnitude of the load, thereby increasing the efficiency under light load.

According to the present disclosure, a metal-oxide semiconductor field-effect transistor with asymmetric parallel dies includes a metal-oxide semiconductor field-effect transistor, a load recognition control unit, and an inductor that are electrically connected to each other. The metal-oxide semiconductor field-effect transistor includes a first die, a second die, and a switch. In use, the inductor produces a voltage signal according to the change in the load. Meanwhile, the load recognition control unit controls the switch according to the voltage signal to switch on the first die and the second die. The first die is larger in size than the second die. In case of the light load, the metal-oxide semiconductor field-effect transistor drive the second die for conduction. Since the second die is a smaller die, the drive can be done with a smaller gate drive voltage, thereby reducing the drive loss and the overall power loss of the metal-oxide semiconductor field-effect transistor with the asymmetric parallel dies. In addition, the effect of improving efficiency under light load can be effectively achieved while taking into account the size and cost.

DETAILED DESCRIPTION OF PREFERRED EMBODIMENTS

Figure 1:
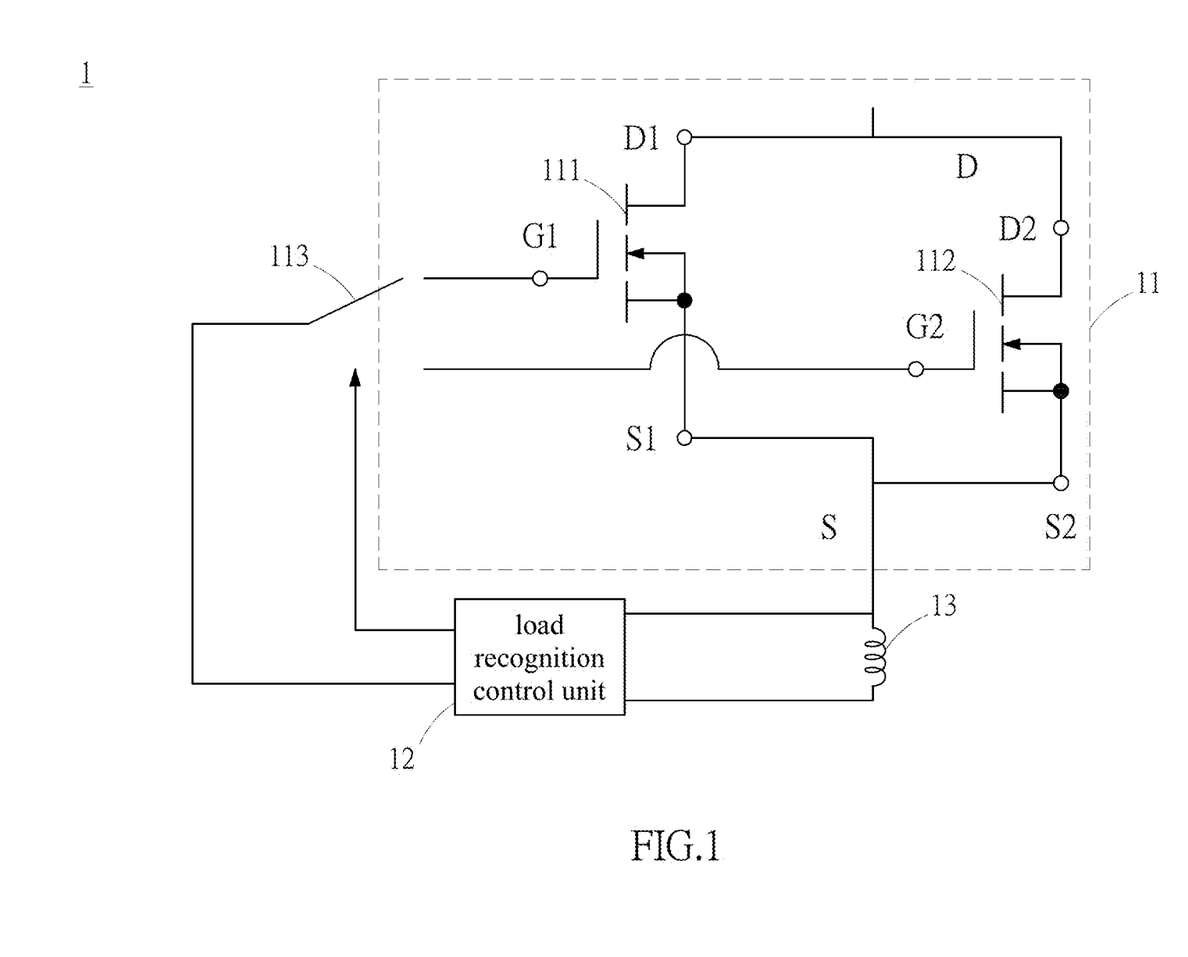
FIG. 1 is a block diagram of a circuit according to an embodiment of the present disclosure.

Referring to FIG. 1, a metal-oxide semiconductor field-effect transistor 1 with asymmetric parallel dies in accordance with the present disclosure includes a metal-oxide semiconductor field-effect transistor 11, a load recognition control unit 12, and an inductor 13.

The metal-oxide semiconductor field-effect transistor 11 includes a first die 111, a second die 112, and a switch 113. The first die 111 and the second die 112 are connected in parallel. A source S of the metal-oxide semiconductor field-effect transistor 11 consists of a source S1 of the first die 111 and a source S2 of the second die 112. A drain D of the metal-oxide semiconductor field-effect transistor 11 consists of drain D1 of the first die 111 and the drain of the second die 112. The first die 111 and the second die 112 are two dies with different sizes. The first die 111 is a die with a larger size than the second die 112, and the second die 112 is a die with a smaller size than the first die 111. Compared with the first die 111, the second die 112 has a smaller size, lower power consumption, and better switching efficiency, and can achieve the no-load standby characteristics under light load. The switch 113 is electrically connected to a gate G1 of the first die 111 or a gate G2 of the second die 112. The switch 113 is controlled by the load recognition control unit 12 to bring the metal-oxide semiconductor field-effect transistor 11 in a conduction state through the first die 111 and the second die 112.

One end of the load recognition control unit 12 is electrically connected to the switch 113 while another end of the load recognition control unit 12 is electrically connected to the source S of the metal-oxide semiconductor field-effect transistor 11. The load recognition control unit 12 supplies a voltage signal to control the switch 113 and produces a gate drive voltage V1 (shown in FIGS. 3 and 4) with a magnitude corresponding to a size of one of the first die 111 or the second die 112 which is driven by the gate drive voltage V1, so that the metal-oxide semiconductor field-effect transistor 11 can switch the switch 113 under different loads. In this way, the first die 111 or the second die 112 can be selected to be switched on according to the magnitude of the load. The control means performed by the load recognition control unit 12 can be a digital signal or an analog signal for determination.

The inductor 13 is electrically connected to the source S of the metal-oxide semiconductor field-effect transistor 11 and is connected in parallel with the load recognition control unit 12. The inductor 13 produces a voltage signal based on the change in the load according to Faraday's law of electromagnetic induction and transmits it to the load recognition control unit 12 so that the load recognition control unit 12 may perform the switch control.

Figure 2:
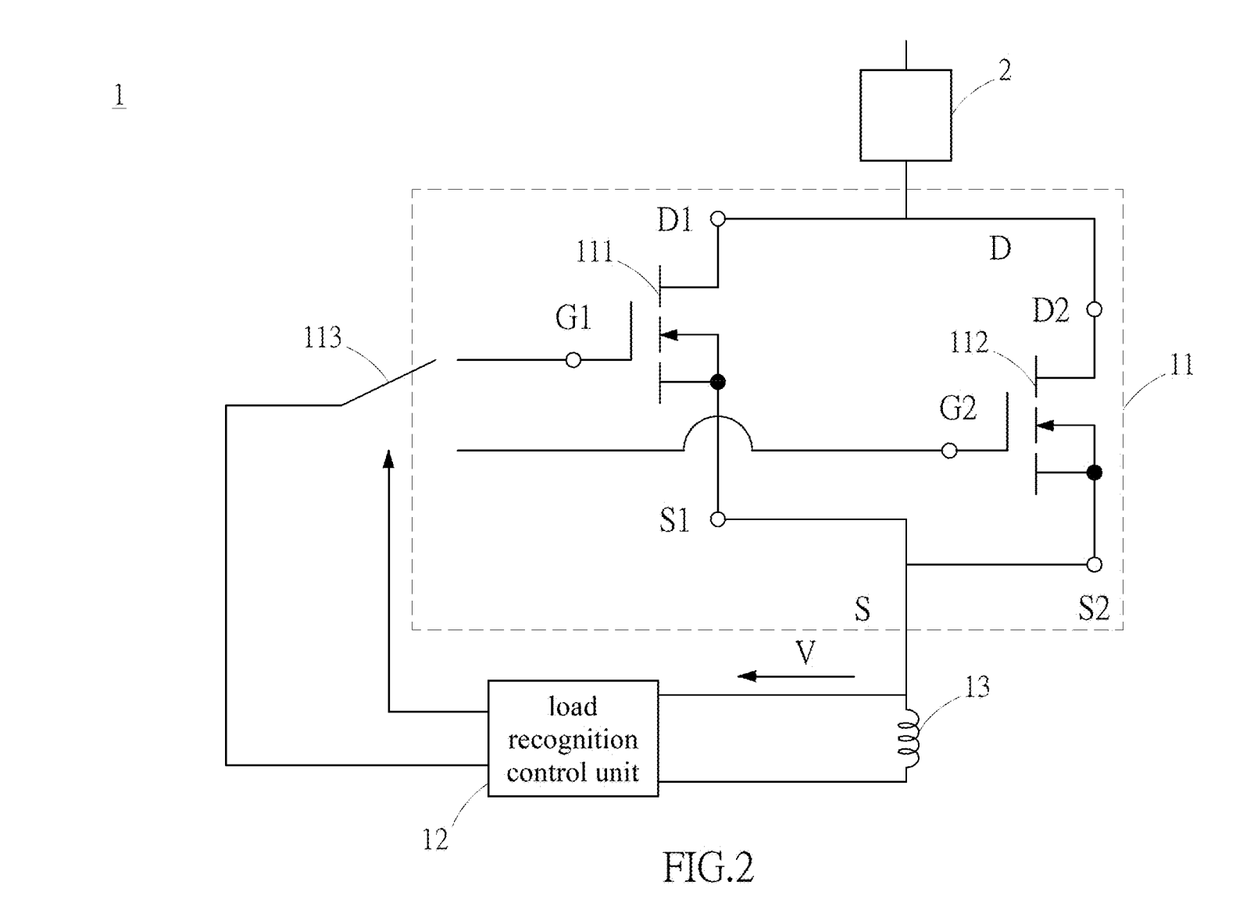
FIG. 2 is an implementation view I of the present disclosure.

Referring to FIG. 2, the metal-oxide semiconductor field-effect transistor 1 with the asymmetric parallel dies of the present disclosure is electrically connected to a load 2. Meanwhile, the load 2 is electrically connected to the drain D of the metal-oxide semiconductor field-effect transistor 11. According to Ohm's law, the current passing through the inductor 13 varies with the magnitude of the load 2. Also, according to the law of electromagnetic induction, the inductor 13 induces a voltage signal V from the change in current. Based on the voltage signal V, the load recognition control unit 12 controls the switch 113 to switch on/off the first die 111 and the second die 112 respectively, thereby changing the characteristics of the metal-oxide semiconductor field-effect transistor 1 with the asymmetric parallel dies according to different light and heavy loads.

Figure 3:
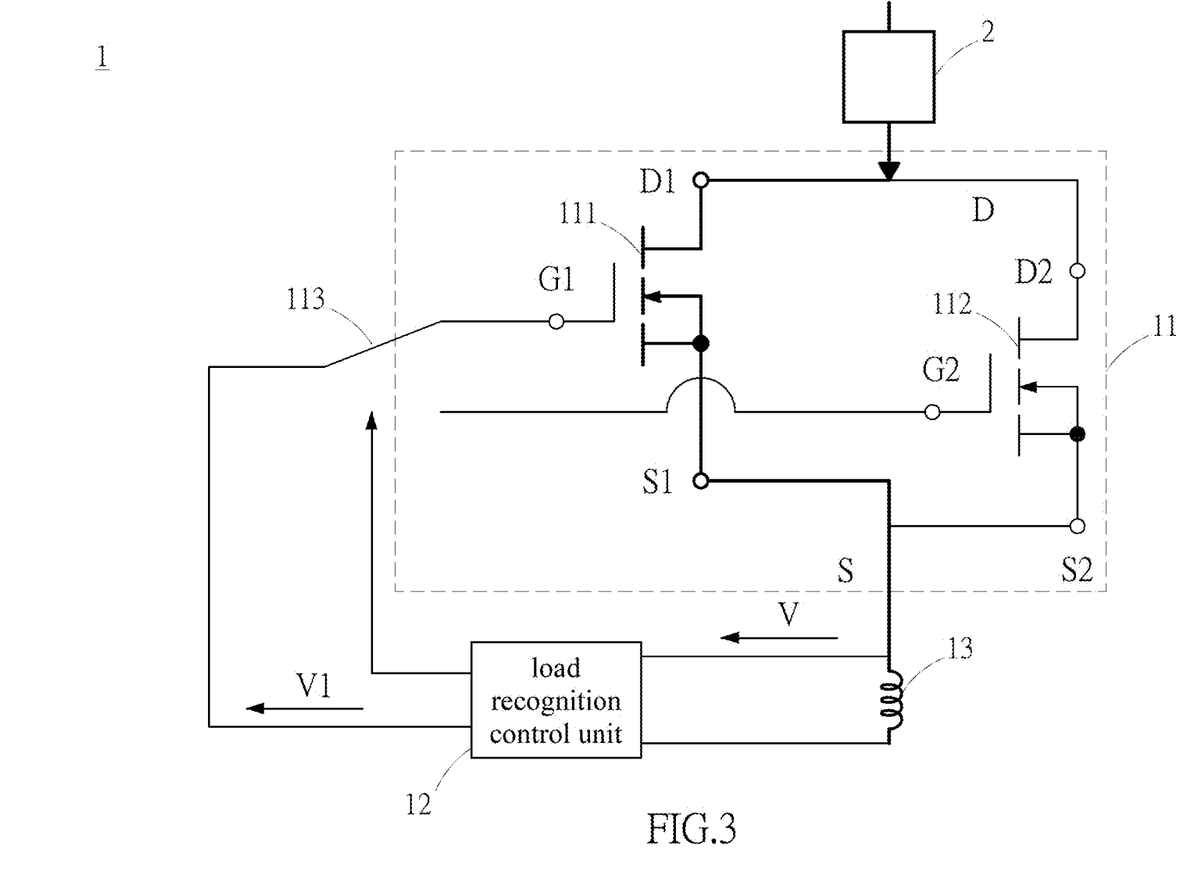
FIG. 3 is an implementation view II of the present disclosure.

Referring to FIG. 3, when the metal-oxide semiconductor field-effect transistor 1 with the asymmetric parallel dies of the present disclosure is applied to a heavy load, the inductor 13 produces a voltage signal V. Meanwhile, the load recognition control unit 12 controls the switch 113 based on the voltage signal V to bring the gate G1 of the first die 111 in a conduction state. Moreover, the load recognition control unit 12 produces a gate drive voltage V1 to bring the first die 111 of the metal-oxide semiconductor field-effect transistor 1 with the asymmetric parallel dies in a conduction state, while the second die 112 thereof is brought in a non-conduction state. When the metal-oxide semiconductor field-effect transistor 1 with the asymmetric parallel dies is under heavy load, the larger first die 111 can be employed for conduction. Since the conduction loss accounts for a larger proportion of the overall power loss under heavy load than the drive loss, the use of the first die 111 for conduction has a lower power loss than the use of the second die 112.

Figure 4:
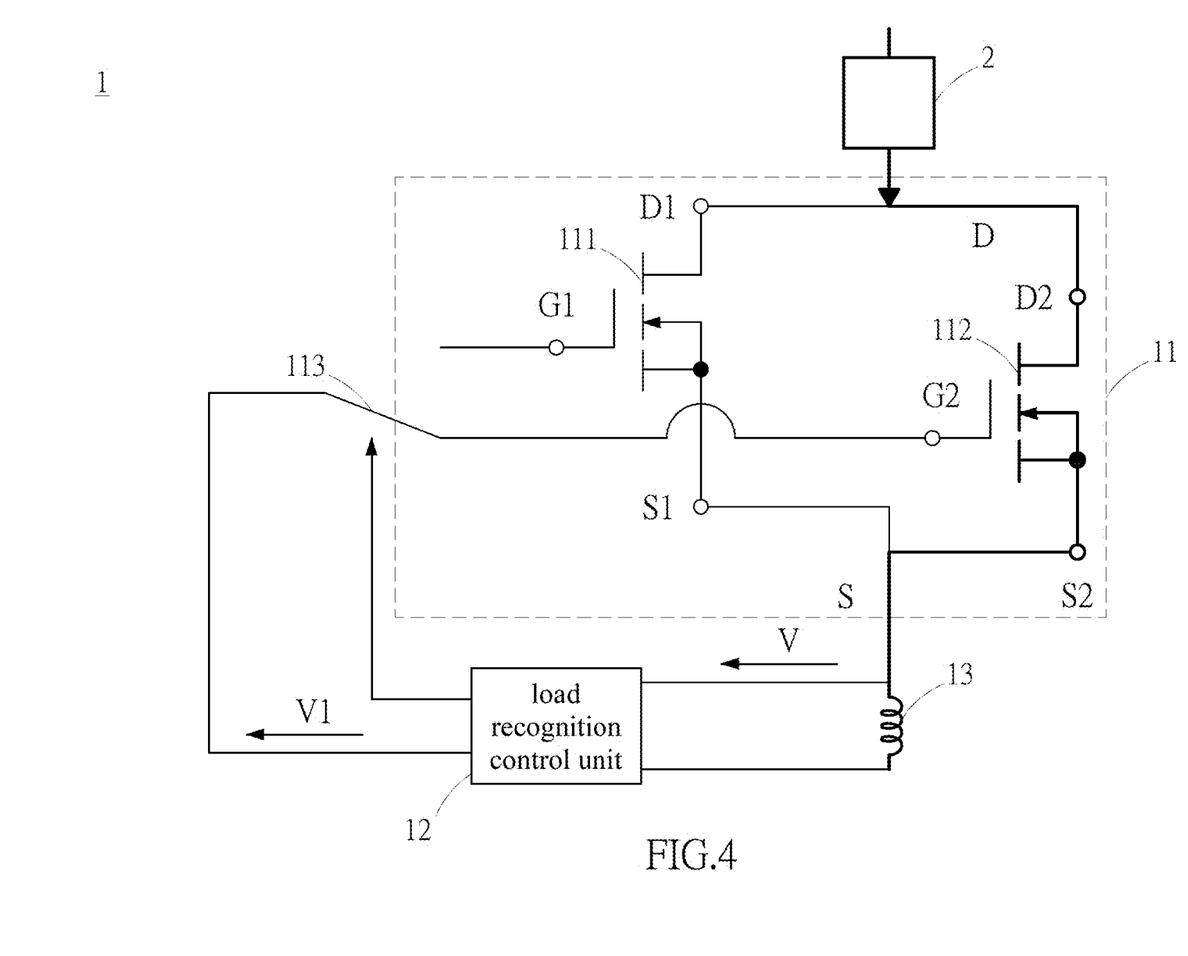
FIG. 4 is an implementation view III of the present disclosure.

Referring to FIG. 4, when the metal-oxide semiconductor field-effect transistor 1 with the asymmetric parallel dies of the present disclosure is applied to a light load, the inductor 13 produces a voltage signal. Meanwhile, the load recognition control unit 12 controls the switch 113 based on the voltage signal V to bring the gate G2 of the second die 112 in a conduction state. Moreover, the load recognition control unit 12 produces a gate drive voltage V1 to bring the second die 112 of the metal-oxide semiconductor field-effect transistor 1 with the asymmetric parallel dies in a conduction state, while the first die 111 thereof is brought in a non-conduction state. When the metal-oxide semiconductor field-effect transistor 1 with the asymmetric parallel dies is under light load, the smaller second die 112 can be employed for conduction. Since the drive loss accounts for a larger proportion of the overall power loss under light load than the conduction loss, a smaller gate drive voltage V1 can be used for driving by switching to the second die 112, which further reduces the drive loss and the overall power loss of the metal-oxide semiconductor field-effect transistor 1 with the asymmetric parallel dies. In addition, a better efficiency and a no-load standby can be achieved through the smaller second die 112.

Figure 5:
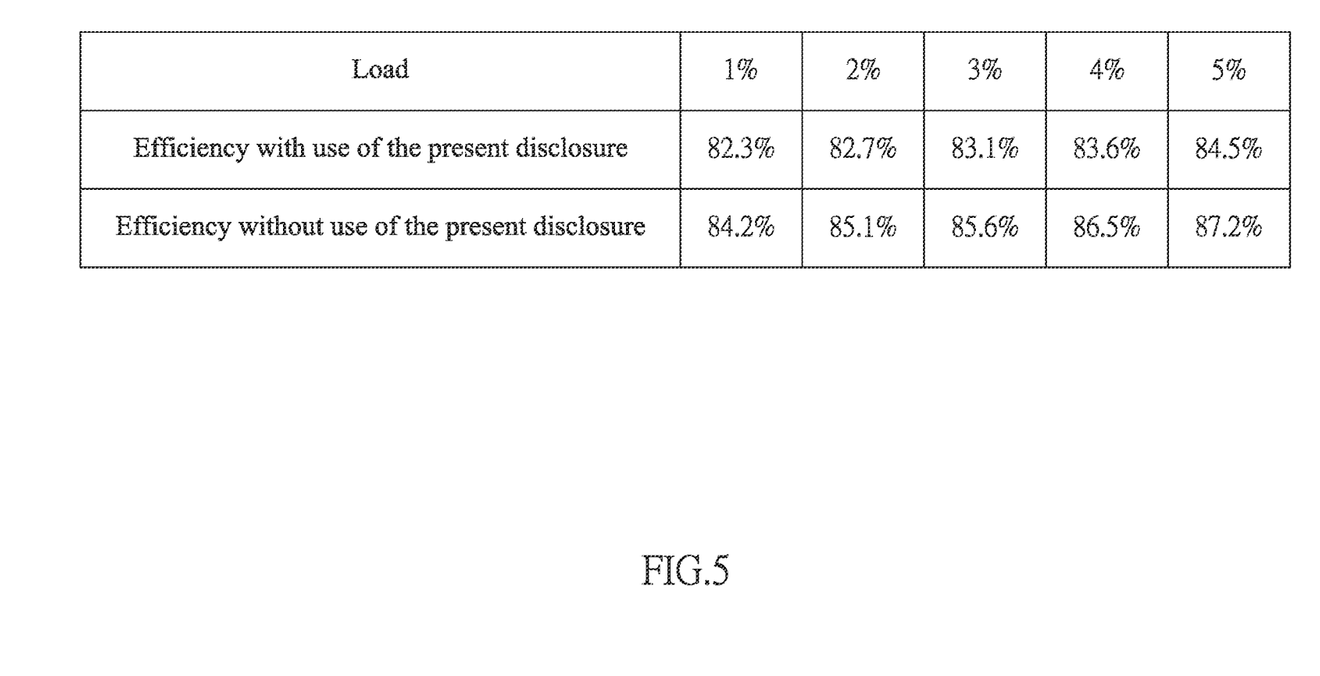
FIG. 5 is one embodiment of the present disclosure.
Figure 6:
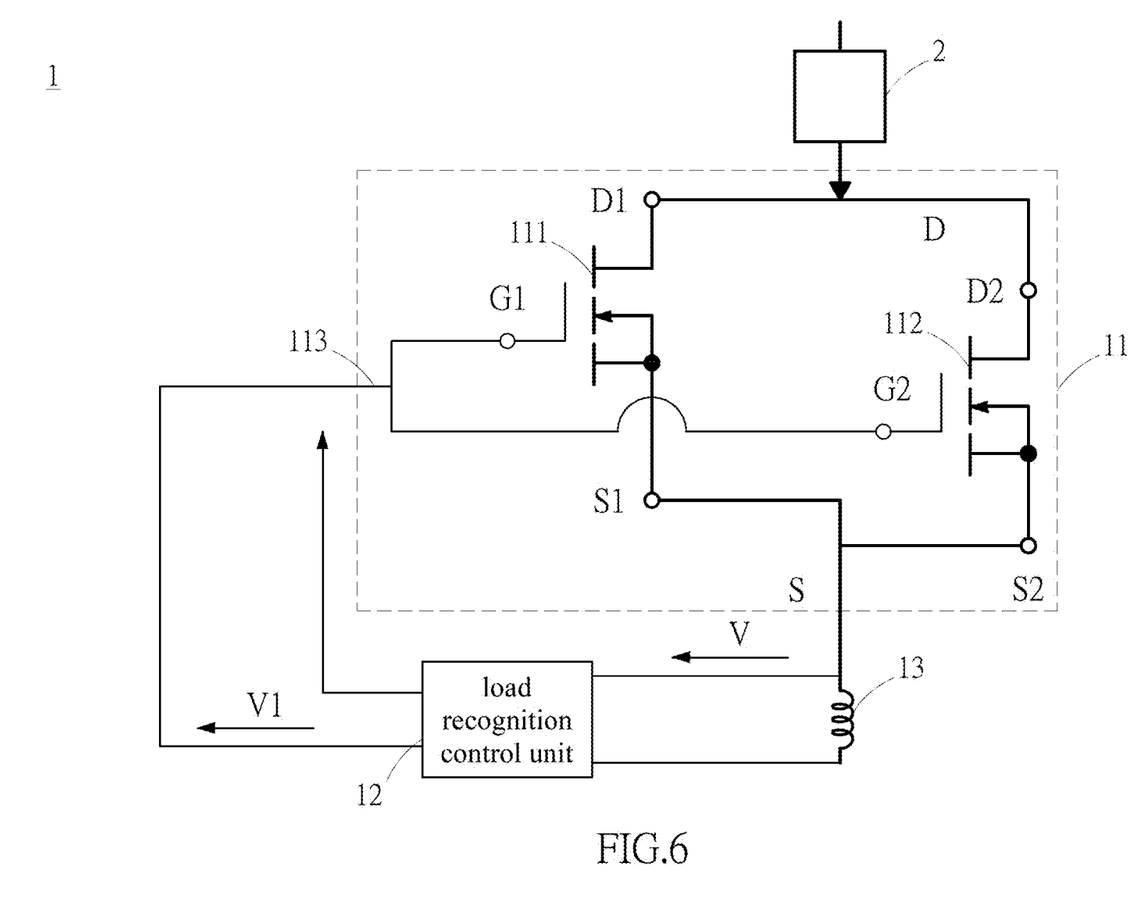
FIG. 6 is another embodiment of the present disclosure.

Referring to FIG. 5 and FIG. 1, the metal-oxide semiconductor field-effect transistor 1 with the asymmetric parallel dies of the present disclosure can be switched under heavy load and light load such that first die 111 and the second die 112 are switched on/off respectively, thereby effectively improving the light load efficiency of the overall system (including the metal-oxide semiconductor field-effect transistor 1 with the asymmetric parallel dies of the present disclosure and the load). The light load means that the load is less than 10% as an example. It means that when the load is greater than 10%, it is a heavy load. The metal-oxide semiconductor field-effect transistor 1 with the asymmetric parallel dies is switched to the first die 111 for conduction under the heavy load. When the load is less than 10%, it is a light load. The metal-oxide semiconductor field-effect transistor 1 with the asymmetric parallel dies is switched to the second die 112 for conduction. As shown in the table, in the light load condition (when the load is less than 10%), the efficiency with the present disclosure and the efficiency without the present invention is compared. As shown in the table, after applying the present invention, the efficiency at each light load is significantly improved.

In addition to the fact that the switch 113 is switched to the larger first die 111 in the case of a heavy load determined by the load recognition control unit 12, the switch 113 may also be connected to the gate G1 of the first die 111 and the gate G2 of the second die 112 such that the first die 111 and the second die 112 are switched on at the same time. Since the conduction loss accounts for a larger proportion of the overall power loss under heavy load than the drive loss, the conduction loss can be reduced by connection in parallel, thereby effectively improve the efficiency of the metal metal-oxide semiconductor field-effect transistor 1 with the asymmetric parallel dies under heavy load.

In addition to the first die 111 and the second die 112, the metal-oxide semiconductor field-effect transistor 1 with the asymmetric parallel dies of the present disclosure can also include a plurality of dies connected in parallel with the first die 111 and the second die 112. It should be noted that each die can have various sizes. The load recognition control unit 12 controls the switch 113 based on the voltage signal of the inductor 13, so that the first die, the second die, and the plurality of dies are respectively switched on, switched on in parallel, or switched on in a way of a combination thereof based on the load. Therefore, the best circuit connection method can be selected under different load conditions to optimize the efficiency.

It can be seen from the above that the metal-oxide semiconductor field-effect transistor with the asymmetric parallel dies of the present disclosure includes a metal-oxide semiconductor field-effect transistor with a first die, a second die, and a switch connected in parallel. Moreover, a load recognition control unit 12 and an inductor are electrically connected to the metal-oxide semiconductor field-effect transistor. The inductor can produce a voltage signal based on the change in the load. The load recognition control unit 12 controls the switch based on the voltage signal to switch on the first die or the second die. In a case of a heavy load after judgement, the larger first die is switched on, or the first die and the second die are switched on at the same time. In a case of a light load, the smaller second die is switched on. In addition, the metal-oxide semiconductor field-effect transistor 11 may further include a plurality of dies. The first die, the second die, and each of the plurality of dies are respectively switched on or switched on in parallel or in a way of a combination thereof through the load recognition control unit 12 and the switch. Through the metal-oxide semiconductor field-effect transistor 1 with the asymmetric parallel dies of the present disclosure, different dies can be switched on according to the load conditions, thereby reducing the volume and cost, and effectively improving the efficiency under light load condition.

REFERENCE SIGN

1 metal-oxide semiconductor field-effect transistor with asymmetric parallel die
11 metal-oxide semiconductor field-effect transistor
111 first die
112 second die
113 switch
12 load recognition control unit
13 inductor
S source of the metal-oxide semiconductor field-effect transistor
D drain of the metal-oxide semiconductor field-effect transistor
S1 source of the first die
S2 source of the second die
D1 drain of the first die
D2 drain of the second die
G1 gate of the first die
G2 gate of the second die
V voltage signal
2 load

What is claimed is:

1. A metal-oxide semiconductor field-effect transistor with asymmetric parallel dies for modulation according to a change in a load to improve power conversion efficiency, comprising:
    a metal-oxide semiconductor field-effect transistor having a first die, a second die, and a switch, the first die being larger in size than the second die, the first die being connected in parallel to the second die, the switch being electrically connected to a gate of the first die or a gate of the second die, thereby switching on the first die or the second die;
    a load recognition control unit, one end thereof being electrically connected to the switch, another end thereof being electrically connected to a source of the first die and a source of a second die, the load recognition control unit controlling the switch according to a voltage signal, and producing a gate drive voltage with a magnitude corresponding to a size of one of the first die or the second die which is driven by the gate drive voltage; and
    an inductor electrically connected to the metal-oxide semiconductor field-effect transistor and connected to the load recognition control unit in parallel, the inductor producing the voltage signal according to the change in the load.

2. The metal-oxide semiconductor field-effect transistor with the asymmetric parallel dies as claimed in claim 1, wherein the load recognition control unit controls the switch with a digital signal or an analog signal.

3. The metal-oxide semiconductor field-effect transistor with the asymmetric parallel dies as claimed in claim 1, wherein the switch is used to switch on the first die and the second die at a same time.

4. A method of using the metal-oxide semiconductor field-effect transistor with asymmetric parallel dies of claim 1, comprising:
    producing the voltage signal by use of the inductor based on the change in the load;
    switching on the first die for conduction when the load is a heavy load by the load recognition control unit controlling the switch according to the voltage signal; and
    switching on the second die for conduction when the load is a light load by the load recognition control unit.

5. The method as claimed in claim 4, wherein the first die and the second die are switched on by the switch at a same time when the load is a heavy load.

* * * * *